(12) United States Patent
Zha (10) Patent No.: US 10,862,612 B2
(45) Date of Patent: Dec. 8, 2020

(54) DATA TRANSMISSION METHOD, DATA RECEIVING METHOD, AND DATA SENDING AND RECEIVING SYSTEM

(71) Applicant: Huawei Technologies Co., Ltd., Shenzhen (CN)

(72) Inventor: Min Zha, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/396,209

(22) Filed: Apr. 26, 2019

(65) Prior Publication Data
US 2019/0253178 A1    Aug. 15, 2019

Related U.S. Application Data

(63) Continuation of application No. PCT/CN2017/106724, filed on Oct. 18, 2017.

(30) Foreign Application Priority Data

Oct. 28, 2016   (CN) .......................... 2016 1 0977456

(51) Int. Cl.
  *H04J 14/08*    (2006.01)
  *H04J 3/16*     (2006.01)
  *H04L 5/00*     (2006.01)

(52) U.S. Cl.
  CPC ............ *H04J 14/08* (2013.01); *H04J 3/1658* (2013.01); *H04J 3/1694* (2013.01);
  (Continued)

(58) Field of Classification Search
  None
  See application file for complete search history.

(56) References Cited

U.S. PATENT DOCUMENTS 8,848,533 B1     9/2014  Stuart et al.
2012/0082263 A1  4/2012  Ebrahimi Tazeh Mahalleh et al.
(Continued)

FOREIGN PATENT DOCUMENTS

CN   103026771 A   4/2013
CN   103688499 A   3/2014
(Continued)

OTHER PUBLICATIONS

Optical Internetworking Forum (OIF), "Flex Ethernet Implementation Agreement," IA # OIF-Flexe-01.1, Jun. 21, 2017, 35 pages.
Noriki, M. et al., "Time Division Multiple Access Protocol for a Fiber-Optical Passive Double Star Transport System," IEICE Transactions on Communications, vol. E78-B, No. 7, Jul. 1995, pp. 995-1001.
(Continued)

Primary Examiner — Darren E Wolf
(74) Attorney, Agent, or Firm — Slater Matsil, LLP (57) ABSTRACT

A method includes: generating indication information, where the indication information is used to indicate a resource allocation table corresponding to a first data unit in the plurality of data units; sending the indication information in a timeslot previous to a timeslot used to send the first data unit; and sending the plurality of data units, where a resource allocation table corresponding to each data unit is selected from a plurality of resource allocation tables in a cyclic manner, and a cyclically initial resource allocation table is the resource allocation table indicated by the indication information.

15 Claims, 8 Drawing Sheets

(52) U.S. Cl.
CPC .......... *H04L 5/0053* (2013.01); *H04L 5/0091* (2013.01); *H04J 2203/0069* (2013.01); *H04J 2203/0076* (2013.01); *H04J 2203/0085* (2013.01); *H04J 2203/0091* (2013.01); *H04L 5/0064* (2013.01)

(56) References Cited

U.S. PATENT DOCUMENTS

| | | |
|---|---|---|
| 2014/0247789 A1 | 9/2014 | Li et al. |
| 2016/0007104 A1 | 1/2016 | Chen et al. |
| 2016/0294990 A1* | 10/2016 | Cao ...................... H04L 1/0083 |
| 2016/0295624 A1 | 10/2016 | Novlan et al. |
| 2016/0373215 A1* | 12/2016 | Nan ......................... H04L 1/08 |
| 2019/0081760 A1* | 3/2019 | Ren ...................... H04L 1/0073 |

FOREIGN PATENT DOCUMENTS

| | | |
|---|---|---|
| CN | 103974427 A | 8/2014 |
| CN | 104253676 A | 12/2014 |
| CN | 104954100 A | 9/2015 |
| CN | 105357716 A | 2/2016 |

OTHER PUBLICATIONS

Trowbridge, S. et al., "Flex Ethernet Implementation Agreement 1.0," IA # OIF-Flexe-01.0, Mar. 2016, 31 pages.
Samsung, "Remaining details on resource pool configuration," 3GPP TSG RAN WG1 #86bis, R1-1608992, Lisbon, Portugal; Oct. 10-14, 2016, 3 pages.

* cited by examiner

DATA TRANSMISSION METHOD, DATA RECEIVING METHOD, AND DATA SENDING AND RECEIVING SYSTEM

CROSS-REFERENCE TO RELATED APPLICATIONS

This application is a continuation of International Application No. PCT/CN2017/106724, filed on Oct. 18, 2017, which claims priority to Chinese Patent Application No. 201610977456.2, filed on Oct. 28, 2016, both of which are hereby incorporated by reference in their entireties.

TECHNICAL FIELD

The present invention relates to the field of Ethernet, and in particular, to a data transmission method, a data receiving method, and a data sending and receiving system for flexible Ethernet (FlexE).

BACKGROUND 802.3-based Ethernet defined by the Institute of Electrical and Electronics Engineers (IEEE) standard organization is applied to various scenarios as a service interface and has gained a huge success. Rapid popularization of Ethernet promotes evolution of Ethernet from a pure interface technology to a network technology similar to a transport network. Currently, the Optical Internetworking Forum (OIF) is discussing expansion of application scenarios of conventional Ethernet, to support functions such as sub-rating, channelization, and inverse multiplexing of an Ethernet service. Such an Ethernet technology is referred to as flexible Ethernet (Flex Ethernet, FlexE).

At the present stage, Ethernet is widely used as a service interface in an access network and a metropolitan area network. The FlexE technology can implement a seamless connection to an Ethernet interface of an underlying service network, and functions such as multi-rating, channelization, and inverse multiplexing can be introduced by using the FlexE technology. This greatly expands application scenarios of Ethernet, improves application flexibility of Ethernet, and makes the Ethernet technology gradually penetrate into the field of transport networks.

In the FlexE implementation agreement (OIF-FLEXE-01.1) proposed by the OIF, a FlexE structure includes a plurality of data units and overhead blocks. Each data unit includes 20 data blocks, and is sent by using 20 consecutive timeslots. Each link has a sub-calendar sub-calendar, and the sub-calendar records services that are separately sent by using the 20 timeslots. However, in the prior art, each data unit can correspond only to this sub-calendar, and service allocation is not flexible enough.

SUMMARY

Embodiments of the present invention provide a data sending method, to resolve a problem that service allocation is not flexible enough in an existing FlexE technology.

According to a first aspect, a data sending method is provided, and is used to consecutively send a plurality of data units, where each data unit is sent by using a plurality of consecutive timeslots, and the method includes: generating indication information, where the indication information is used to indicate a resource allocation table corresponding to a first data unit in the plurality of data units; sending the indication information in a timeslot previous to a timeslot used to send the first data unit; and sending the plurality of data units, where a resource allocation table corresponding to each data unit is selected from a plurality of resource allocation tables in a cyclic manner, and a cyclically initial resource allocation table is the resource allocation table indicated by the indication information.

In the sending method provided in this embodiment, the resource allocation table corresponding to each data unit is selected from the plurality of resource allocation tables in the cyclic manner. This is compatible with a FlexE data structure specified in the OIF-FLEXE-01.1, and service allocation is more flexible.

With reference to the first aspect, in a first possible implementation of the first aspect, before the generating indication information, the method further includes: setting the plurality of resource allocation tables, where the plurality of resource allocation tables are used to indicate timeslot allocation on a same physical link.

With reference to the first aspect or the first possible implementation of the first aspect, in a second possible implementation of the first aspect, the cyclic manner is specifically: selecting a resource allocation table consecutively for a plurality of times, and then selecting a next resource allocation table. In this embodiment of the present invention, a changing speed of the resource allocation table can be decreased, thereby lowering a requirement for hardware.

With reference to the first aspect or the first possible implementation of the first aspect, in a third possible implementation of the first aspect, the resource allocation table records a service sent in each of a plurality of timeslots, the data unit includes a plurality of data blocks used to carry a service, and a quantity of the timeslots recorded in the resource allocation table is the same as a quantity of the data blocks included in the data unit.

With reference to the third possible implementation of the first aspect, in a fourth possible implementation of the first aspect, the sending the plurality of data units specifically includes: for each timeslot occupied by the plurality of data units, determining, based on the resource allocation table corresponding to each data unit, a service sent in the timeslot, and sending, by using the timeslot, a data block carrying the service.

According to a second aspect, a data receiving method is provided, and is used to consecutively receive a plurality of data units, and the method includes: receiving indication information, where the indication information is used to indicate a resource allocation table corresponding to a first data unit in the plurality of data units; and receiving the plurality of data units, where a resource allocation table corresponding to each data unit is selected from a plurality of resource allocation tables in a cyclic manner, and a cyclically initial resource allocation table is the resource allocation table indicated by the indication information. In this embodiment of the present invention, if resource allocation tables for a transmit end and a receive end do not match each other, the receive end may detect the indication information to make the resource allocation tables for the transmit end and the receive end match each other again.

With reference to the second aspect, in a first possible implementation of the second aspect, before the receiving indication information, the method further includes: setting the plurality of resource allocation tables, where the plurality of resource allocation tables are used to indicate timeslot allocation on a same physical link.

With reference to the second aspect or the first possible implementation of the second aspect, in a second possible implementation of the second aspect, the cyclic manner is specifically: selecting a resource allocation table consecutively for a plurality of times, and then selecting a next resource allocation table.

With reference to the second aspect or the first possible implementation of the second aspect, in a third possible implementation of the second aspect, the resource allocation table records a service received in each of a plurality of timeslots, the data unit includes a plurality of data blocks used to carry a service, and a quantity of the timeslots recorded in the resource allocation table is the same as a quantity of the data blocks included in the data unit.

With reference to the third possible implementation of the second aspect, in a fourth possible implementation of the second aspect, after the receiving the plurality of data units, the method further includes: determining, based on the resource allocation table corresponding to each data unit, a specific service received in the timeslot.

According to a third aspect, a data sending device is provided, and is configured to consecutively send a plurality of data units, where each data unit is sent by using a plurality of consecutive timeslots, and the device includes: a generator, a processor, and a transmitter, where the generator is configured to: generate indication information, and send the indication information to the transmitter, where the indication information is used to indicate a resource allocation table corresponding to a first data unit in the plurality of data units; the processor is configured to use the resource allocation table indicated by the indication information as a cyclically initial resource allocation table, where a resource allocation table corresponding to each data unit is selected from a plurality of resource allocation tables in a cyclic manner; and the transmitter is configured to send the indication information in a timeslot previous to a timeslot used to send the first data unit, and is further configured to send the plurality of data units.

In the sending device provided in this embodiment, the resource allocation table corresponding to each data unit is selected from the plurality of resource allocation tables in the cyclic manner. This is compatible with a FlexE data structure specified in the OIF-FLEXE-01.1, and service allocation is more flexible.

With reference to the third aspect, in a first possible implementation of the third aspect, the device further includes a setter, where the setter is configured to set the plurality of resource allocation tables, where the plurality of resource allocation tables are used to indicate timeslot allocation on a same physical link.

With reference to the third aspect or the first possible implementation of the third aspect, in a second possible implementation of the third aspect, the cyclic manner is specifically: selecting a resource allocation table consecutively for a plurality of times, and then selecting a next resource allocation table. In this embodiment of the present invention, a changing speed of the resource allocation table can be decreased, thereby lowering a requirement for hardware.

With reference to the third aspect or the first possible implementation of the third aspect, in a third possible implementation of the third aspect, the resource allocation table records a service sent in each of a plurality of timeslots, the data unit includes a plurality of data blocks used to carry a service, and a quantity of the timeslots recorded in the resource allocation table is the same as a quantity of the data blocks included in the data unit.

With reference to the third possible implementation of the third aspect, in a fourth possible implementation of the third aspect, the transmitter is specifically configured to: for each timeslot occupied by the plurality of data units, determine, based on the resource allocation table corresponding to each data unit, a service sent in the timeslot, and send, by using the timeslot, a data block carrying the service.

According to a fourth aspect, a data receiving device is provided, and is configured to consecutively receive a plurality of data units, where the device includes a receiver and a processor, where the receiver is configured to: receive indication information, and send the indication information to the processor, where the indication information is used to indicate a resource allocation table corresponding to a first data unit in the plurality of data units; and is further configured to receive the plurality of data units; and the processor is configured to use the resource allocation table indicated by the indication information as a cyclically initial resource allocation table, where a resource allocation table corresponding to each data unit is selected from a plurality of resource allocation tables in a cyclic manner. In this embodiment of the present invention, if resource allocation tables for a sending device and the receiving device do not match each other, the receiving device may detect the indication information to make the resource allocation tables for the sending device and the receiving device match each other again.

With reference to the fourth aspect, in a first possible implementation of the fourth aspect, the device further includes a setter, where the setter is configured to set the plurality of resource allocation tables, where the plurality of resource allocation tables are used to indicate timeslot allocation on a same physical link.

With reference to the fourth aspect or the first possible implementation of the fourth aspect, in a second possible implementation of the fourth aspect, the cyclic manner is specifically: selecting a resource allocation table consecutively for a plurality of times, and then selecting a next resource allocation table.

With reference to the fourth aspect or the first possible implementation of the fourth aspect, in a third possible implementation of the fourth aspect, the resource allocation table records a service received in each of a plurality of timeslots, the data unit includes a plurality of data blocks used to carry a service, and a quantity of the timeslots recorded in the resource allocation table is the same as a quantity of the data blocks included in the data unit.

With reference to the third possible implementation of the fourth aspect, in a fourth possible implementation of the fourth aspect, the processor is further configured to determine, based on the resource allocation table corresponding to each data unit, a specific service received in the timeslot.

According to a fifth aspect, a data sending and receiving system is provided, including the sending device described in any one of the third aspect or the possible implementations of the third aspect and the receiving device described in any one of the fourth aspect or the possible implementations of the fourth aspect.

According to a sixth aspect, a data sending method is provided, and is used to consecutively send a plurality of data groups, where each data group includes a plurality of data units, each data unit is sent by using a plurality of consecutive timeslots, and the method includes: generating indication information, where the indication information is used to indicate a resource allocation table corresponding to a first data unit in the data group; sending the indication information in a timeslot previous to a timeslot used to send the first data unit; and sending the data group, where a resource allocation table corresponding to each data unit is selected from a plurality of resource allocation tables in a cyclic manner, the cyclic process is started only once in a process of sending the plurality of data groups, and a cyclically initial resource allocation table is a resource allocation table corresponding to the first data unit in a first data group.

In the sending method provided in this embodiment, the resource allocation table corresponding to each data unit is selected from the plurality of resource allocation tables in the cyclic manner. This is compatible with a FlexE data structure specified in the OIF-FLEXE-01.1, and service allocation is more flexible.

With reference to the sixth aspect, in a first possible implementation of the sixth aspect, before the generating indication information, the method further includes: setting the plurality of resource allocation tables, where the plurality of resource allocation tables are used to indicate timeslot allocation on a same physical link.

With reference to the sixth aspect or the first possible implementation of the sixth aspect, in a second possible implementation of the sixth aspect, the cyclic manner is specifically: selecting a resource allocation table consecutively for a plurality of times, and then selecting a next resource allocation table. In this embodiment of the present invention, a changing speed of the resource allocation table can be decreased, thereby lowering a requirement for hardware.

With reference to the second possible implementation of the sixth aspect, in a third possible implementation of the sixth aspect, the indication information is further used to indicate a remaining quantity of times for which the resource allocation table corresponding to the first data unit in the data group is to be selected.

According to a seventh aspect, a data receiving method is provided, and is used to consecutively receive a plurality of data groups, where each data group includes a plurality of data units, and the method includes: receiving indication information, where the indication information is used to indicate a resource allocation table corresponding to a first data unit in the data group; and receiving the data group, where a resource allocation table corresponding to each data unit is selected from a plurality of resource allocation tables in a cyclic manner, and a cyclically initial resource allocation table is the resource allocation table indicated by the indication information. In this embodiment of the present invention, if resource allocation tables for a transmit end and a receive end do not match each other, the receive end may detect the indication information to make the resource allocation tables for the transmit end and the receive end match each other again.

With reference to the seventh aspect, in a first possible implementation of the seventh aspect, before the receiving indication information, the method further includes: setting the plurality of resource allocation tables, where the plurality of resource allocation tables are used to indicate timeslot allocation on a same physical link.

With reference to the seventh aspect or the first possible implementation of the seventh aspect, in a second possible implementation of the seventh aspect, the indication information is further used to indicate a remaining quantity N of times for which the resource allocation table corresponding to the first data unit in the data group is to be selected, where N is a positive integer.

With reference to the second possible implementation of the seventh aspect, in a third possible implementation of the seventh aspect, the cyclic manner is specifically: selecting the resource allocation table consecutively for M times, and then selecting a next resource allocation table, where the resource allocation table indicated by the indication information has been selected consecutively for N times when used as a start for a cyclic process, where M is a positive integer not less than N.

In the sending method provided in this embodiment, the resource allocation table corresponding to each data unit is selected from the plurality of resource allocation tables in the cyclic manner. This is compatible with a FlexE data structure specified in the OIF-FLEXE-01.1, and service allocation is more flexible.

BRIEF DESCRIPTION OF THE DRAWINGS

To describe the technical solutions in the embodiments of the present invention more clearly, the following briefly describes the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

The following describes the technical solutions in the embodiments of the present invention with reference to the accompanying drawings in the embodiments of the present invention. Apparently, the described embodiments are some rather than all of the embodiments of the present invention. All other embodiments obtained by a person of ordinary skill in the art based on the embodiments of the present invention without creative efforts shall fall within the protection scope of the present invention.

In the following description, to illustrate rather than limit, specific details such as a particular system structure, an interface, and a technology are provided to make a thorough understanding of the present invention. However, a person skilled in the art should know that the present invention may be practiced in other embodiments without these specific details. In other cases, detailed descriptions of well-known apparatuses, circuits, and methods are omitted, so that the present invention is described without being obscured by unnecessary details.

When ordinal numbers such as "first", "second", "third", and "fourth" are used in the embodiments of the present invention, unless the ordinal numbers represent a sequence according to the context, it should be understood that the ordinal numbers are merely used for differentiation.

For ease of understanding of a person skilled in the art, the technical solutions of the present invention are described in the present invention by using the following embodiments.

802.3-based Ethernet defined by the IEEE standard organization may be applied to various scenarios as a service interface, and has gained a huge success. Rapid popularization of Ethernet promotes evolution of Ethernet from a pure interface technology to a network technology similar to a transport network. Currently, the OIF is discussing expansion of application scenarios of conventional Ethernet, to support functions such as sub-rating, channelization, and inverse multiplexing of an Ethernet service. This Ethernet technology is FlexE. For example, for a sub-rating application scenario of the Ethernet service, the FlexE technology can support transferring of a 250 G Ethernet service over three channels of existing 100 G physical interfaces, and remaining 50 G bandwidth may be further used to transmit another service, thereby improving bandwidth utilization.

Figure 1:
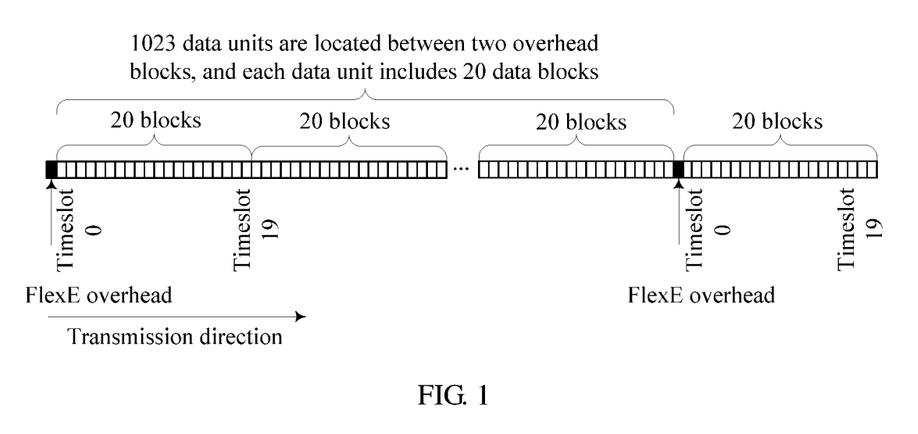
FIG. 1 is a FlexE data structure specified in the OIF-FLEXE-01.1.
Figure 2:
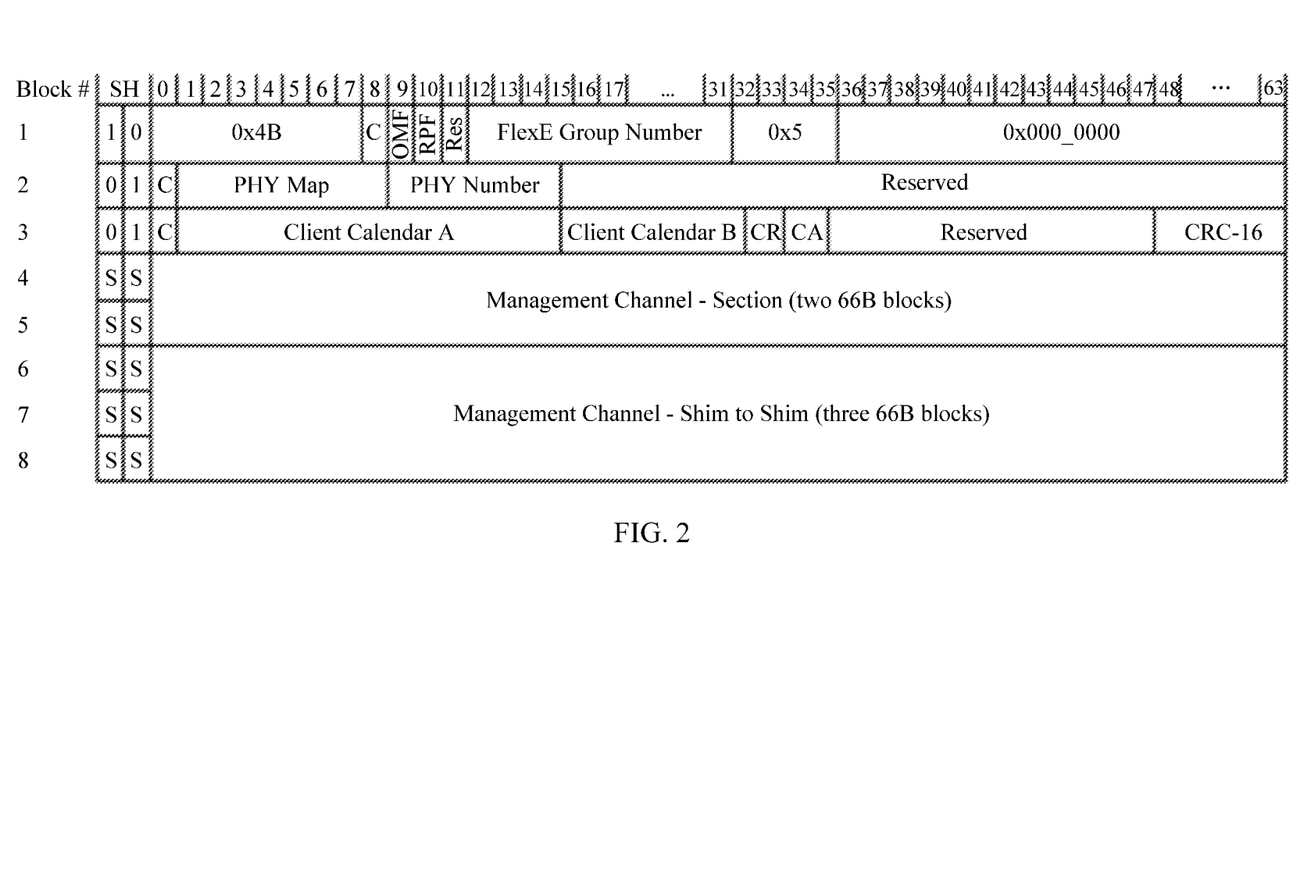
FIG. 2 is a frame structure of a FlexE overhead frame.

Specifically, FIG. 1 is a FlexE data structure specified in the OIF-FLEXE-01.1. It can be learned from the figure that the FlexE data structure includes a data block and an overhead block. One data unit includes 20 data blocks, and one overhead block is added every 1023 data units. The overhead block and the 1023 data units jointly form a frame structure. It is assumed that the frame structure is referred to as a first subframe. Further, every eight first subframes form a first frame, and eight overhead blocks in the first frame form a FlexE overhead frame. A frame structure of the FlexE overhead frame is shown in FIG. 2.

Further, for a 100 Gbps port, the OIF-FLEXE-01.1 specifies division of 20 timeslots on the 100 Gbps port, and a sub-calendar is used to indicate services that are separately sent by using the 20 timeslots. Because a data block is used to carry a service, which data block should be sent in which timeslot can be learned based on the sub-calendar.

It should be noted that a sending device and a receiving device that use the FlexE technology may be connected to each other by using a plurality of links. The technical solutions of the present invention may be applied to all links at the same time, and application manners on all the links are the same. Therefore, for ease of description, the technical solutions of the present invention are described in relation to one link.

Figure 3:
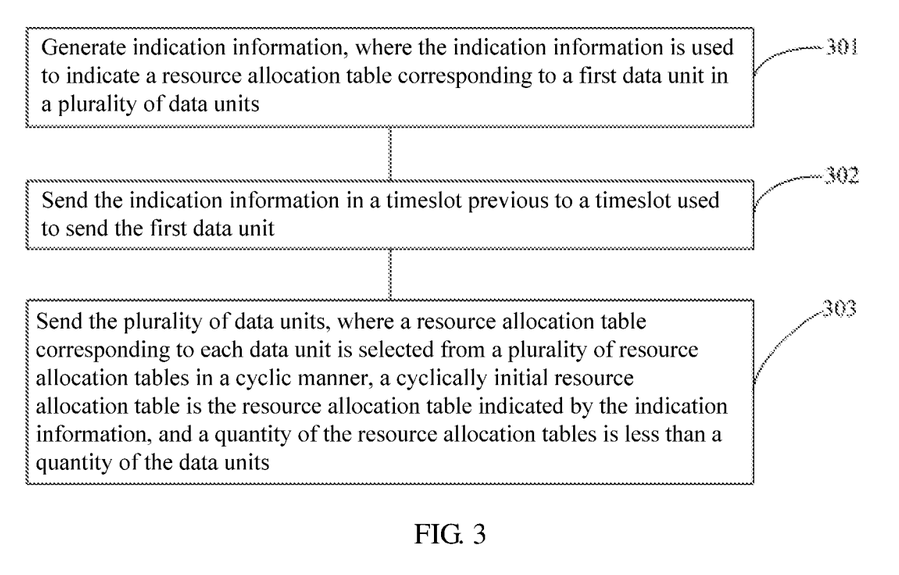
FIG. 3 is a flowchart of a sending method according to an embodiment of the present invention.

An embodiment of the present invention provides a data sending method, used to consecutively send a plurality of data units, where each data unit is sent by using a plurality of consecutive timeslots. As shown in FIG. 3, the method includes the following steps.

301. Generate indication information, where the indication information is used to indicate a resource allocation table corresponding to a first data unit in the plurality of data units.

Corresponding to an existing FlexE structure, in this embodiment of the present invention, a data unit is equivalent to including 20 data blocks, and a resource allocation table is equivalent to a sub-calendar and records services that are separately sent by using 20 timeslots.

It should be noted that to correctly receive data, a sending device and a receiving device need to support a same resource allocation table selection manner, and two ends support resource allocation tables that are the same in content and quantity. This requires resource allocation tables for the sending device and the receiving device to be synchronized. However, transitory failure, update configuration, or protection switching of a link/device may cause out-of-synchronization between the resource allocation tables, affecting receiving of data. If the sending device performs timeslot allocation by using a resource allocation table while the receiving device performs timeslot allocation by using another resource allocation table, the receiving device erroneously identifies a service carried in a received data block, causing a service error.

To reduce service errors caused by the out-of-synchronization of the resource allocation tables, the solution used in this embodiment of the present invention is: sending the indication information. A receive end learns, by identifying the indication information, the resource allocation table corresponding to the first data unit in the plurality of received data units. Because resource allocation table selection manners of a transmit end and the receive end are consistent, the resource allocation tables for the receive end and the transmit end can be synchronized again.

Optionally, before step 301, the method further includes: setting a plurality of resource allocation tables, where the plurality of resource allocation tables are used to indicate timeslot allocation on a same physical link.

302. Send the indication information in a timeslot previous to a timeslot used to send the first data unit.

Specifically, it is assumed that a quantity of the plurality of data units is 1023. Because there is one overhead block every 1023 data units, and as shown in FIG. 1, the overhead block is sent in a timeslot previous to a timeslot occupied by a first data unit in the 1023 data units, the indication information may be inserted into the overhead block, and is sent together with the overhead block. In this case, even though the resource allocation tables for the sending device and the receiving device are out of synchronization, when the receiving device receives the overhead block, the receiving device can immediately know a resource allocation table corresponding to a next data unit, and restore the resource allocation tables used by the sending device and the receiving device to a synchronized state. In the FlexE data structure specified in the OIF-FLEXE-01.1, on a 100 Gbps link, a period of the overhead block is 13.1 microseconds. Therefore, in a worst case, that is, an out-of-synchronization phenomenon occurs immediately after a previous overhead block carrying the indication information is detected, the sending device and the receiving device can be restored to a synchronized state within 13.1 microseconds by using the method. The method has an advantage of a fast restoration speed.

If a quantity of the plurality of data units is 8194 (8×1023), the indication information is sent once every 8194 data units. Therefore, as shown in FIG. 1, the indication information may be inserted into a first overhead block in a FlexE overhead frame, and is sent together with the overhead block. In the FlexE data structure specified in the OIF-FLEXE-01.1, on a 100 Gbps link, a period of the FlexE overhead frame is 104.77 microseconds. Therefore, in a worst case, the resource allocation tables can still be restored to a synchronized state within 104.77 microseconds by using the method. A restoration speed is slightly lower than that in the previous solution. However, as shown in FIG. 2, the indication information may replace a part or all of a field filled with zeros in the first overhead block in the FlexE overhead frame, the structure of the FlexE overhead frame does not need to be changed, and compatibility is better.

Optionally, the indication information may also be inserted into a second overhead block or a third overhead block in the FlexE overhead frame to replace a part or all of a reserved field in the second overhead block or the third overhead block, the structure of the FlexE overhead frame does not need to be changed either, and compatibility is good. That is, when the indication information is inserted into any one to three of the first three overhead blocks in the FlexE overhead frame, compatibility with the structure of the existing FlexE overhead frame can be ensured.

303. Send the plurality of data units, where a resource allocation table corresponding to each data unit is selected from a plurality of resource allocation tables in a cyclic manner, and a cyclically initial resource allocation table is the resource allocation table indicated by the indication information.

Optionally, a quantity of the resource allocation tables is less than a quantity of the data units.

A resource allocation table records a service sent in each of a plurality of timeslots, a data unit includes a plurality of data blocks used to carry a service, and a quantity of the timeslots recorded in the resource allocation table is the same as a quantity of the data blocks included in the data unit. For each timeslot occupied by the plurality of data units, a service sent in the timeslot is determined based on the resource allocation table corresponding to each data unit, and a data block carrying the service is sent in the timeslot. For example, in a selected resource allocation table, if a first service corresponds to a first timeslot, the first timeslot is used to send a data block carrying the first service; or if a first service corresponds to a third timeslot, a fourth timeslot, and a fifth timeslot, the three timeslots may all be used to send the data block carrying the first service.

In the sending method provided in this embodiment, the resource allocation table corresponding to each data unit is selected from the plurality of resource allocation tables in the cyclic manner. This is compatible with the FlexE data structure specified in the OIF-FLEXE-01.1, and service allocation is more flexible.

Figure 4:
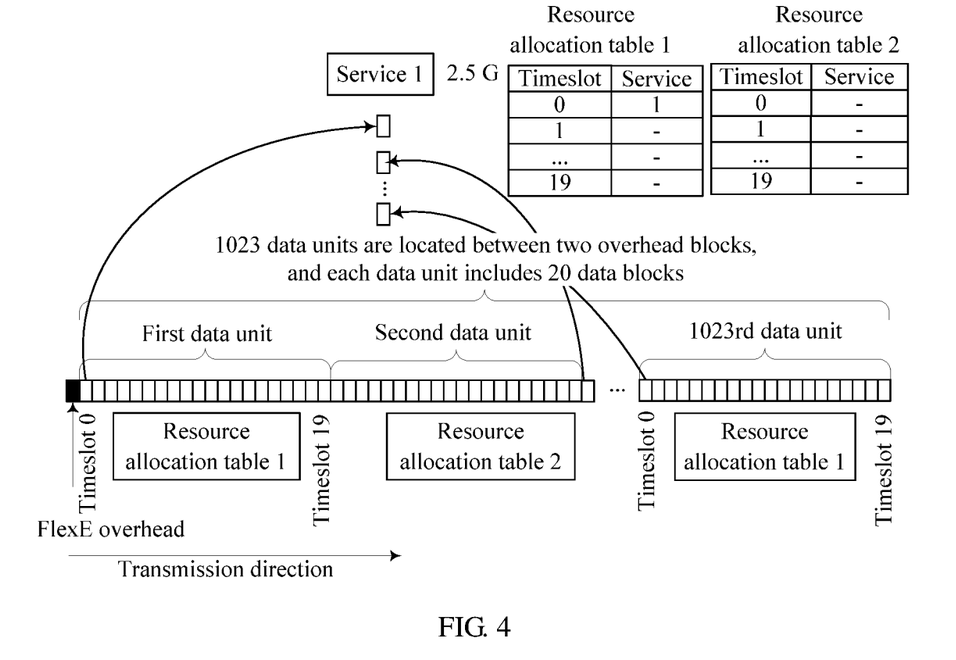
FIG. 4 is an implementation of a 2.5 Gbps allocation granularity.

In addition, in this embodiment of the present invention, an allocation granularity of a service can be decreased without changing the existing FlexE data structure. Specifically, a description is made by using an example in which a rate of 2.5 Gbps is allocated for a 100 Gbps port specified in the OIF-FLEXE-01.1. Two resource allocation tables are set and denoted as a resource allocation table 1 and a resource allocation table 2, and each resource allocation table indicates services that are separately sent by using 20 timeslots. It is assumed that the plurality of data units are a data group. As shown in FIG. 4, the indication information indicates the resource allocation table 1, that is, the first data unit in the data group corresponds to the resource allocation table 1. The resource allocation table 1 is used as a cyclically initial resource allocation table, a second data unit corresponds to the resource allocation table 2, a third data unit corresponds to the resource allocation table 1 again, and so on until a resource allocation table corresponding to the last data unit in the data group is known. Then, a resource allocation table indicated by a next piece of indication information is used as a cyclically initial resource allocation table, to determine a resource allocation table corresponding to each data unit in a next data group. In this case, if only the resource allocation table 1 in the two resource allocation tables records that there is one timeslot used to send the first service, that is, only one timeslot used to send the first service occurs every 40 timeslots, a rate allocated to the first service is 2.5 Gbps, that is, an allocation granularity is 2.5 Gbps.

It can be learned that if five resource allocation tables are set, an allocation granularity may be decreased to 1 Gbps, or if N resource allocation tables are set, the allocation granularity may be decreased to (100/20N) Gbps. It can be learned that in this embodiment of the present invention, a low-rate service can be supported flexibly on the premise of compatibility with the existing FlexE data structure. In addition, this embodiment of the present invention is irrelevant to a specific transmission rate, and can be applied to a link of any rate.

It should be understood that the foregoing merely provides one cyclic manner of resource allocation tables, and there may be another cyclic manner. For example, the cyclic manner of the resource allocation tables may be 1221-1221- . . . or 112221-112221- . . . , and this is not limited in this embodiment of the present invention.

Optionally, in another embodiment, the cyclic manner is specifically: selecting a resource allocation table consecutively for a plurality of times, and then selecting a next resource allocation table. Assuming that a next resource allocation table is selected after a resource allocation table is selected consecutively twice, it indicates that once a resource allocation table is selected, a service sent in each of 40 consecutive timeslots is determined based on the resource allocation table.

Figure 5:
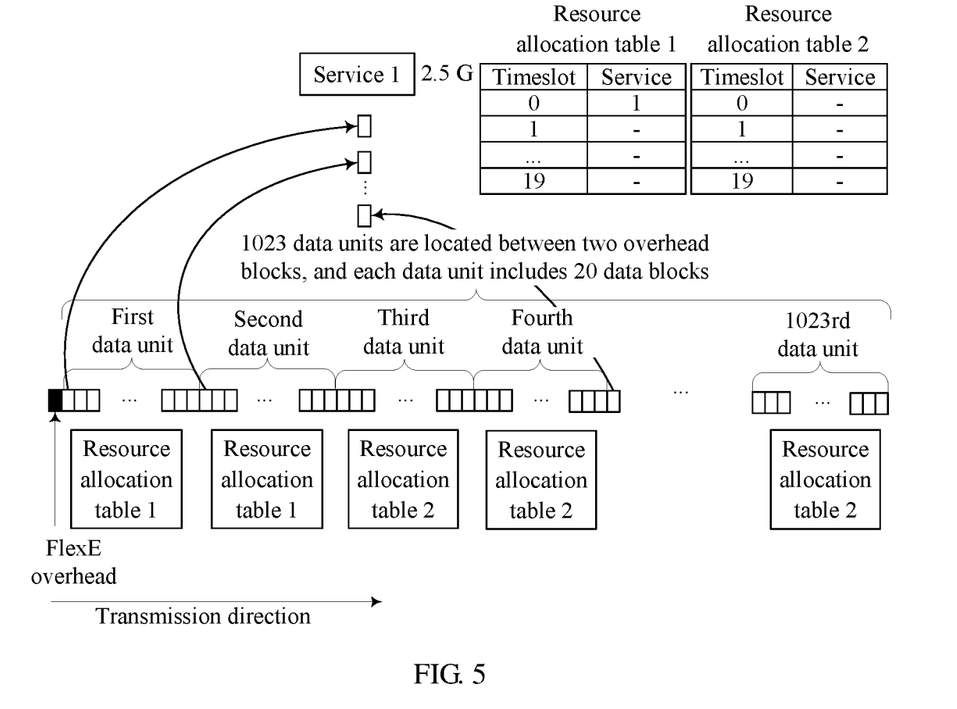
FIG. 5 is another implementation of a 2.5 Gbps allocation granularity.

Specifically, two resource allocation tables are set and denoted as a resource allocation table 1 and a resource allocation table 2, and after a resource allocation table is selected consecutively twice, a next resource allocation table is selected. As shown in FIG. 5, it is assumed that the plurality of data units are a data group, and the indication information indicates the resource allocation table 1, that is, the first data unit in the data group corresponds to the resource allocation table 1. The resource allocation table 1 is used as a cyclically initial resource allocation table, a second data unit corresponds to the resource allocation table 1, a third and a fourth data units correspond to the resource allocation table 2, a fifth and a sixth data units correspond to the resource allocation table 1 again, and so on. Then, a resource allocation table indicated by a next piece of indication information is used as a cyclically initial resource allocation table, to determine a resource allocation table corresponding to each data unit in a next data group. In this case, if only the resource allocation table 1 in the two resource allocation tables records that there is one timeslot used to send a first service, that is, two timeslots used to send the first service occur every 80 timeslots, an allocation granularity is decreased to 2.5 Gbps.

It should be understood that if a next resource allocation table is selected immediately after a resource allocation table is selected once, a waiting time of data blocks carrying different services in the sending device is the shortest. For example, the first service has no corresponding timeslot in the resource allocation table 1, and has a corresponding timeslot only in the resource allocation table 2. A smaller quantity of times for which the resource allocation table 1 is selected consecutively indicates a shorter waiting time of a data block carrying the first service. However, if each resource allocation table is selected consecutively for many times, it also means that a changing speed of the resource allocation table for the transmit end does not need to be too fast, better facilitating hardware implementation. Therefore, a quantity of times for which the resource allocation table is selected consecutively before a next resource allocation table is selected depends on an actual application situation, and this is not limited in this embodiment of the present invention.

In addition, there are many specific implementations of a correspondence between a data unit and a resource allocation table. For example, a number of a data unit may be divided by a number of a resource allocation table, and an obtained remainder is a number of a resource allocation table corresponding to the data unit. Alternatively, the transmit end stores a resource allocation table corresponding to one data unit or several data units previous to each data unit after the first data unit in each data group, and determines, based on the resource allocation table, a resource allocation table corresponding to a current data unit. This is not limited in this embodiment of the present invention.

Figure 6:
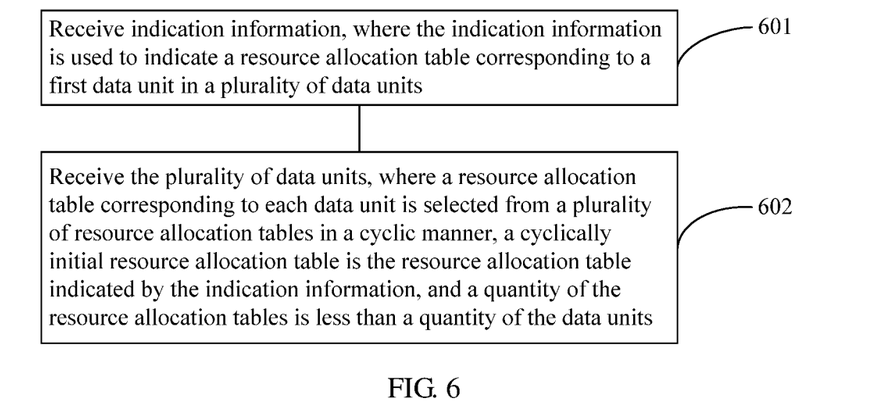
FIG. 6 is a flowchart of a receiving method according to another embodiment of the present invention.

Another embodiment of the present invention provides a data receiving method, used to consecutively receive a plurality of data units. As shown in FIG. 6, the method includes the following steps.

601. Receive indication information, where the indication information is used to indicate a resource allocation table corresponding to a first data unit in the plurality of data units.

Specifically, because the indication information is inserted into an overhead block for sending, the overhead block may be detected, to identify the indication information at a preset location in the overhead block. One piece of indication information is received periodically. This is equivalent to that synchronization correction is performed once every other time period on a resource allocation table used by a receiving device. Therefore, impact caused by a mismatch between resource allocation tables used by a sending device and the receiving device is reduced.

Optionally, before step 601, the method further includes: setting a plurality of resource allocation tables, where the plurality of resource allocation tables are used to indicate timeslot allocation on a same physical link.

602. Receive the plurality of data units, where a resource allocation table corresponding to each data unit is selected from a plurality of resource allocation tables in a cyclic manner, and a cyclically initial resource allocation table is the resource allocation table indicated by the indication information.

Specifically, a resource allocation table records a service received in each of a plurality of timeslots, a data unit includes a plurality of data blocks used to carry a service, and a quantity of the timeslots recorded in the resource allocation table is the same as a quantity of the data blocks included in the data unit. That is, a specific service received in the timeslot can be determined based on the resource allocation table corresponding to the data unit. Optionally, a quantity of the resource allocation tables is less than a quantity of the data units.

It should be noted that each time a receive end receives a piece of indication information, the receive end determines, based on the indication information, a resource allocation table corresponding to a first data unit subsequent to the indication information, and uses the resource allocation table as a start for a new cyclic process of the plurality of resource allocation tables. A specific cyclic process is shown in an example shown in FIG. 4. If the cyclic manner is specifically: selecting a resource allocation table consecutively for a plurality of times, and then selecting a next resource allocation table, a specific cyclic process is shown in an example shown in FIG. 5, and a quantity of times for which the resource allocation table is selected consecutively in the receive end is consistent with a quantity of times for which the resource allocation table is selected consecutively in a transmit end.

Figure 7:
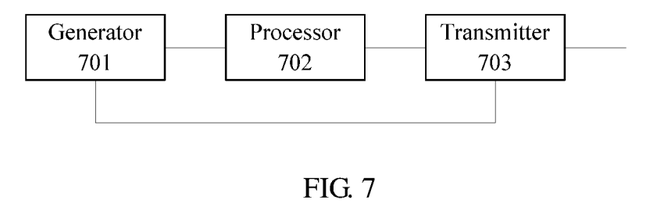
FIG. 7 is a diagram of a sending device according to another embodiment of the present invention.

Another embodiment of the present invention provides a data sending device 700. As shown in FIG. 7, the device 700 includes a generator 701, a processor 702, and a transmitter 703.

The generator 701 is configured to: generate indication information, and send the indication information to the processor 702 and the transmitter 703, where the indication information is used to indicate a resource allocation table corresponding to a first data unit in a plurality of data units.

Optionally, the device 700 further includes a setter 704. The setter 704 is configured to set a plurality of resource allocation tables, where the plurality of resource allocation tables is used to indicate timeslot allocation on a same physical link.

The processor 702 is configured to use the resource allocation table indicated by the indication information as a cyclically initial resource allocation table, where a resource allocation table corresponding to each data unit is selected from the plurality of resource allocation tables in a cyclic manner.

The transmitter 703 is configured to send the indication information in a timeslot previous to a timeslot used to send the first data unit, and is further configured to send the plurality of data units.

Specifically, a resource allocation table records a service sent in each of a plurality of timeslots, a data unit includes a plurality of data blocks used to carry a service, and a quantity of the timeslots recorded in the resource allocation table is the same as a quantity of the data blocks included in the data unit. Therefore, the transmitter 703 is specifically configured to: for each timeslot occupied by the plurality of data units, determine, based on the resource allocation table corresponding to each data unit, a service sent in the timeslot, and send, by using the timeslot, a data block carrying the service. Optionally, a quantity of the resource allocation tables is less than a quantity of the data units.

Optionally, the cyclic manner is specifically: selecting a resource allocation table consecutively for a plurality of times, and then selecting a next resource allocation table. In this embodiment of the present invention, a changing speed of the resource allocation table can be decreased, thereby lowering a requirement for hardware. A specific cyclic process has been described in the foregoing embodiment, and details are not described herein again.

To correctly receive data, the sending device and a receiving device need to support a same quantity of resource allocation tables on a same physical link, and resource allocation tables used by the sending device and the receiving device need to be kept synchronized. However, transitory failure, update configuration, or protection switching of a link/device may cause out-of-synchronization between the sending device and the receiving device, affecting receiving of data. Synchronization between the resource allocation tables for the sending device and the receiving device can be restored by sending the indication information.

Optionally, the indication information may be inserted into any overhead block in a FlexE overhead frame, and synchronization between the resource allocation tables for the sending device and the receiving device can be restored within a maximum of 13.1 microseconds. Alternatively, the indication information may be inserted into a first overhead block in a FlexE overhead frame, and a maximum time of restoring synchronization between the resource allocation tables for the sending device and the receiving device is extended to 104.77 microseconds. However, this may not change a structure of the FlexE overhead frame, and has good compatibility. In addition, the indication information may be inserted into any one to three of the first three overhead blocks in the FlexE overhead frame on the premise of compatibility with the existing FlexE overhead frame.

In the sending device provided in this embodiment, the resource allocation table corresponding to each data unit is selected from the plurality of resource allocation tables in the cyclic manner. An allocation granularity can be decreased without changing the FlexE data structure specified in the OIF-FLEXE-01.1, thereby satisfying more service requirements.

Figure 8:
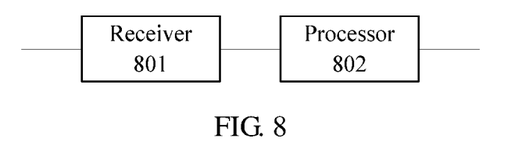
FIG. 8 is a diagram of a receiving device according to another embodiment of the present invention.

Another embodiment of the present invention provides a data receiving device 800, configured to consecutively receive a plurality of data units. As shown in FIG. 8, the device 800 includes a receiver 801 and a processor 802.

The receiver 801 is configured to: receive indication information and the plurality of data units, and send the indication information to the processor 802, where the indication information is used to indicate a resource allocation table corresponding to a first data unit in the plurality of data units.

Specifically, because the indication information is inserted into an overhead block for sending, the overhead block may be detected, to identify the indication information at a preset location in the overhead block. One piece of indication information is received periodically. This is equivalent to that the receiving device performs synchronization correction once every other time period on a correspondence between a data unit and a resource allocation table. Therefore, impact caused by a mismatch between resource allocation tables used by a sending device and the receiving device is reduced.

Optionally, the receiving device 800 further includes a setter 803. The setter 803 is configured to set a plurality of resource allocation tables, where the plurality of resource allocation tables are used to indicate timeslot allocation on a same physical link.

The processor 802 is configured to use the resource allocation table indicated by the indication information as a cyclically initial resource allocation table, where a resource allocation table corresponding to each data unit is selected from the plurality of resource allocation tables in a cyclic manner.

Specifically, a resource allocation table records a specific service received in each of a plurality of timeslots, a data unit includes a plurality of data blocks used to carry a service, and a quantity of the timeslots recorded in the resource allocation table is the same as a quantity of the data blocks included in the data unit. Therefore, the processor 802 is further configured to determine, based on the resource allocation table corresponding to each data unit, a specific service received in the timeslot.

Optionally, a quantity of the resource allocation tables is less than a quantity of the data units.

It should be noted that each time when receiving a piece of indication information, the receiving device determines, based on the indication information, a resource allocation table corresponding to a first data unit subsequent to the indication information, and uses the resource allocation table as a start for a new cyclic process of the plurality of resource allocation tables. A specific cyclic process is shown in an example shown in FIG. 4. If the cyclic manner is specifically: selecting a resource allocation table consecutively for a plurality of times, and then selecting a next resource allocation table, a specific cyclic process is shown in an example shown in FIG. 5, and a quantity of times for which the resource allocation table is selected consecutively in the receiving device is consistent with a quantity of times for which the resource allocation table is selected consecutively in the sending device.

Another embodiment of the present invention provides a data sending and receiving system. The system includes the sending device 700 and the receiving device 800.

The sending device 700 is configured to: generate indication information, where the indication information is used to indicate a resource allocation table corresponding to a first data unit in a plurality of data units; send the indication information in a timeslot previous to a timeslot used to send the first data unit; and send the plurality of data units, where a resource allocation table corresponding to each data unit is selected from a plurality of resource allocation tables in a cyclic manner, and a cyclically initial resource allocation table is the resource allocation table indicated by the indication information.

The receiving device 800 is configured to: receive the indication information, where the indication information is used to indicate the resource allocation table corresponding to the first data unit in the plurality of data units; and receive the plurality of data units, where the resource allocation table corresponding to each data unit is selected from the plurality of resource allocation tables in the cyclic manner, and the cyclically initial resource allocation table is the resource allocation table indicated by the indication information.

In the system provided in this embodiment of the present invention, the resource allocation table corresponding to each data unit is selected from the plurality of resource allocation tables in the cyclic manner, and resource allocation tables used by the sending device and the receiving device are kept synchronized. An allocation granularity can be decreased without changing a FlexE data structure specified in the OIF-FLEXE-01.1, thereby satisfying more service requirements. In addition, this is compatible with the FlexE data structure specified in the FlexE implementation agreement (OIF-FLEXE-01.1) formulated by the Optical Internetworking Forum.

Figure 9:
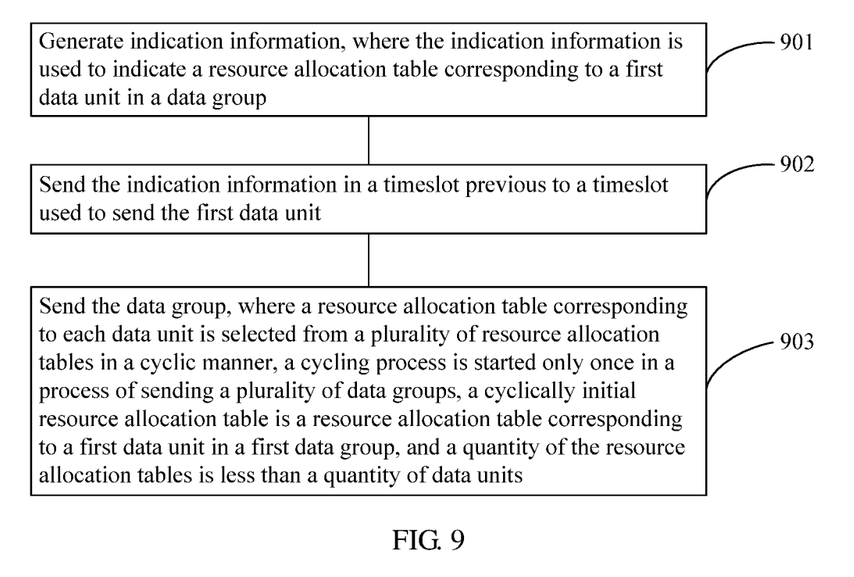
FIG. 9 is a flowchart of a sending method according to another embodiment of the present invention.

Another embodiment of the present invention provides a data sending method, used to consecutively send a plurality of data groups, where each data group includes a plurality of data units, and each data unit is sent by using a plurality of consecutive timeslots. As shown in FIG. 9, the method includes the following steps.

901. Generate indication information, where the indication information is used to indicate a resource allocation table corresponding to a first data unit in a data group.

902. Send the indication information in a timeslot previous to a timeslot used to send the first data unit.

903. Send the data group, where a resource allocation table corresponding to each data unit is selected from a plurality of resource allocation tables in a cyclic manner, the cyclic process is started only once in a process of sending the plurality of data groups, and a cyclically initial resource allocation table is a resource allocation table corresponding to a first data unit in a first data group.

Figure 10:
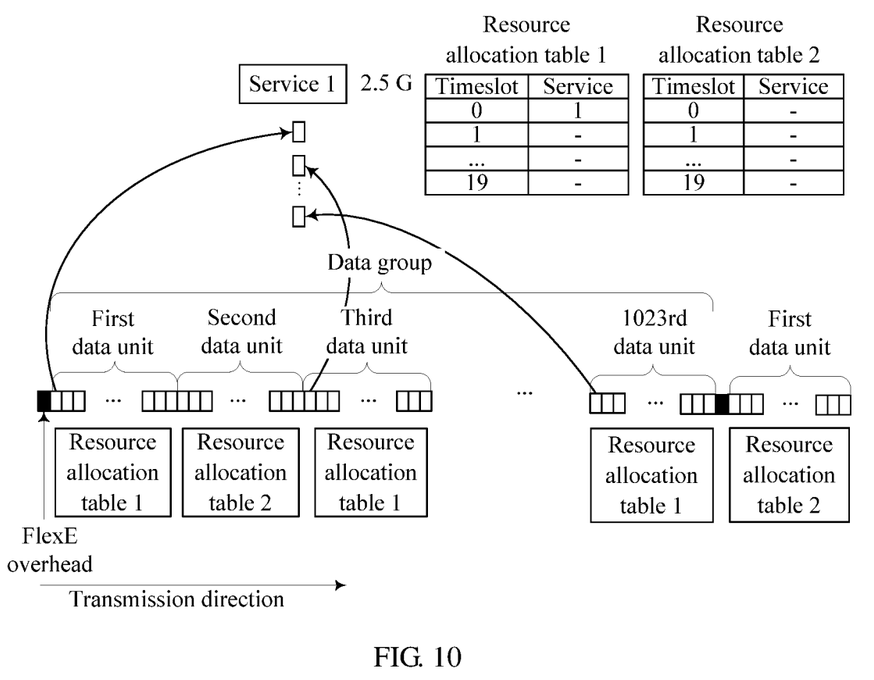
FIG. 10 is another implementation of a 2.5 Gbps allocation granularity.

This embodiment differs from the foregoing steps 301 to 303 in that the cyclic process of the resource allocation tables is started only once throughout a sending process, instead of being started again each time a piece of indication information is found. For example, as shown in FIG. 10, two resource allocation tables are set and denoted as a resource allocation table 1 and a resource allocation table 2, and each resource allocation table indicates services that are separately sent by using 20 timeslots. Assuming that the first data unit in the first data group corresponds to the resource allocation table 1, the resource allocation table 1 is used as the cyclically initial resource allocation table. In the first data group, a second data unit corresponds to the resource allocation table 2, a third data unit corresponds to the resource allocation table 1 again, and by analogy, a $1023^{rd}$ data unit corresponds to the resource allocation table 1.

In this case, in a second data group, a first data unit follows the $1023^{rd}$ data unit in the first data group, and corresponds to the resource allocation table 2, a second data unit corresponds to the resource allocation table 1, and so on. The cyclic process of the resource allocation tables is started only once throughout the sending process. It can be learned from the foregoing description that a first piece of indication information indicates the resource allocation table 1, and a second piece of indication information indicates the resource allocation table 2.

Figure 11:
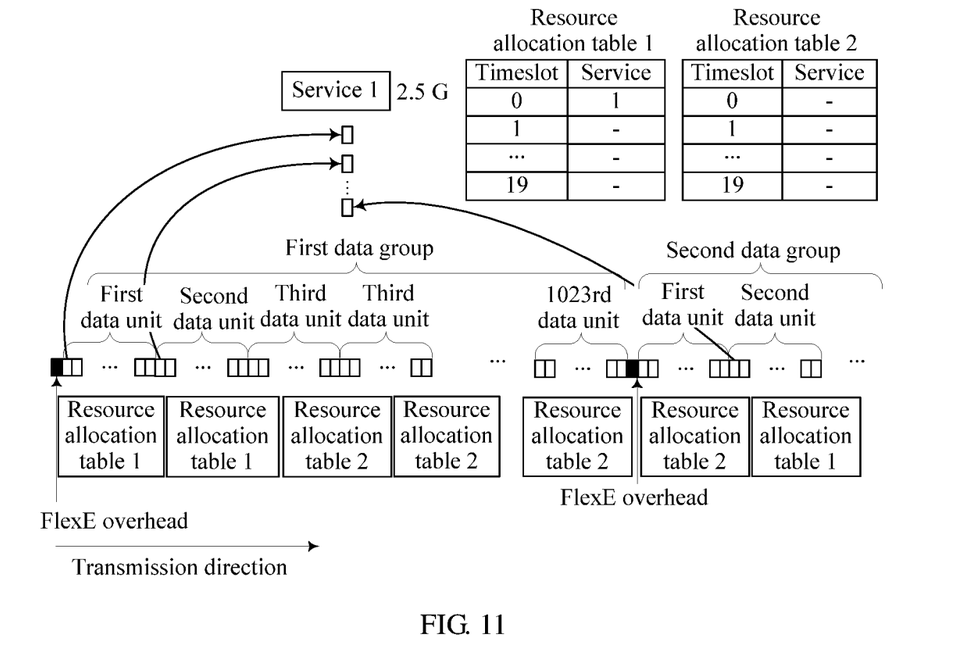
FIG. 11 is another implementation of a 2.5 Gbps allocation granularity.

Optionally, the cyclic manner is specifically: selecting a resource allocation table consecutively for a plurality of times, and then selecting a next resource allocation table. In this case, the indication information is used to indicate the resource allocation table corresponding to the first data unit in the data group, and a remaining quantity of times for which the resource allocation table is to be selected. For example, it is assumed that a next resource allocation table is selected after a resource allocation table is selected consecutively twice. As shown in FIG. 11, the $1023^{rd}$ data unit in the first data group corresponds to the resource allocation table 2, and the first data unit in the second data group also corresponds to the resource allocation table 2. Because the resource allocation table 2 has been selected twice, the second data unit in the second data group corresponds to the resource allocation table 1.

In this case, if the indication information indicates only the resource allocation table corresponding to the first data unit in the data group, but does not indicate the remaining quantity of times for which the resource allocation table is to be selected, a transmit end has selected the resource allocation table 2 once before sending the indication information. However, after receiving the indication information, the receive end still selects the resource allocation table 2 consecutively twice, and mistakes the resource allocation table corresponding to the second data unit in the second data group for the resource allocation table 2, causing errors to all subsequent services.

The receiving method corresponding to steps 901 to 903 is the same as the receiving method described in the foregoing embodiment, except that when the indication information is further used to indicate the remaining quantity N of times for which the resource allocation table corresponding to the first data unit in the data group is to be selected, a specific cyclic process of the resource allocation tables is slightly different, where N is a positive integer.

In this case, the cyclic manner is: selecting a resource allocation table consecutively for M times, and then selecting a next resource allocation table, where M is a positive integer not less than N. The resource allocation table indicated by the indication information has been selected consecutively for N times when used as a start for a cyclic process. As shown in FIG. 11, the first piece of indication information indicates that the resource allocation table 1 is used for the first data block in the first data group, and a remaining quantity of times for which the resource allocation table 1 is to be selected is 2. Therefore, a cyclic process of the resource allocation tables is 11221122 . . . . The second piece of indication information indicates that the resource allocation table 2 is used for the first data block in the second data group, and a remaining quantity of times for which the resource allocation table 2 is to be selected is 1. Therefore, a cyclic process of the resource allocation tables is 2112211 . . . , until a resource allocation table corresponding to the last data unit in the second data group is known. In this case, the resource allocation table 2 has been selected only once when used as a start for the cyclic process.

Optionally, in another embodiment, in the sending device and the receiving device, the indication information may be further used to indicate a resource allocation table allocation sequence. For example, two resource allocation tables are set and denoted as a resource allocation table 1 and a resource allocation table 2. When the indication information is 1, it indicates that the resource allocation table allocation sequence is 121212 . . . ; when the indication information is 2, it indicates that the resource allocation table allocation sequence is 12211221 . . . ; or the like. The sending device may select different resource allocation table allocation manners based on the indication information, and the receiving device also keeps the resource allocation table synchronized with the resource allocation table for the sending device based on the indication information.

It should be understood that "one embodiment" or "an embodiment" mentioned throughout the specification means that particular features, structures, or characteristics related to the embodiment are included in at least one embodiment of the present invention. Therefore, "in one embodiment" or "in an embodiment" appearing throughout the specification does not necessarily refer to a same embodiment. In addition, these particular features, structures, or characteristics may be combined in one or more embodiments by using any appropriate manner. Sequence numbers of the foregoing processes do not mean execution sequences in the embodiments of the present invention. The execution sequences of the processes should be determined based on functions and internal logic of the processes, and should not be construed as any limitation to the implementation processes of the embodiments of the present invention.

In the several embodiments provided in this application, it should be understood that the disclosed system, apparatus, and method may be implemented in other manners. For example, the described apparatus embodiment is merely an example. For example, the unit division is merely logical function division and may be other division during actual implementation. For example, a plurality of units or components may be combined or integrated into another system, or some features may be ignored or not performed. In addition, the shown or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separated, and parts shown as units may or may not be physical units, may be located in one position, or may be distributed on a plurality of network units. Some or all of the units may be selected based on actual needs to achieve the objectives of the solutions of the embodiments of the present invention.

In addition, functional units in the embodiments of the present invention may be integrated into one processing unit, or each of the units may exist alone physically, or two or more units may be integrated into one unit. The integrated unit may be implemented in a form of hardware, or may be implemented in a form of a software functional unit.

In summary, what is described above is merely example embodiments of the technical solutions of the present invention, but is not intended to limit the protection scope of the present invention. Any modification, equivalent replacement, or improvement made without departing from the spirit and principle of the present invention shall fall within the protection scope of the present invention.

What is claimed is:

1. A method, comprising:
generating indication information, wherein the indication information indicates a first resource allocation table of a plurality of resource allocation tables, and the first resource allocation table corresponds to a first data unit of a plurality of data units;
sending the indication information in a first timeslot, wherein the first timeslot is earlier than a second timeslot used to send the first data unit; and
consecutively sending the plurality of data units, wherein each data unit of the plurality of data units is sent using a respective timeslot of a plurality of consecutive time slots, wherein for each of the plurality of data units a respective resource allocation table of the plurality of resource allocation tables corresponding to the respective data unit of the plurality of data units is selected from the plurality of resource allocation tables in a cyclic manner, and an initial resource allocation table used to send the plurality of data units is the first resource allocation table indicated by the indication information.

2. The method according to claim 1, wherein before generating the indication information, the method further comprises:
setting the plurality of resource allocation tables, wherein each of the plurality of resource allocation tables indicates a timeslot allocation on a same physical link.

3. The method according to claim 1, wherein for each of the plurality of data units the respective resource allocation table of the plurality of resource allocation tables corresponding to the respective data unit of the plurality of data units being selected from the plurality of resource allocation tables in the cyclic manner comprises:
the first resource allocation table being selected to use in a first plurality of consecutive timeslots, and then a second resource allocation table of the plurality of resource allocation tables being selected to use in a second plurality of consecutive timeslots.

4. The method according to claim 1, wherein the first resource allocation table records a respective service sent in each of a first plurality of timeslots, the first data unit comprises a plurality of data blocks used to carry a first service, and a quantity of timeslots recorded in the first resource allocation table is the same as a quantity of the data blocks comprised in the first data unit.

5. The method according to claim 1, wherein sending the plurality of data units comprises:
for each timeslot occupied by the plurality of data units, determining, based on the respective resource allocation table corresponding to a data unit of the plurality of data units being sent in the respective timeslot, a respective service being sent in the respective timeslot, and sending, using the respective timeslot, a data block carrying the respective service.

6. A device, comprising:
a transmitter;
a processor; and
a non-transitory computer-readable storage medium storing a program to be executed by the processor, the program including instructions for:
generating indication information, and sending the indication information to the transmitter, wherein the indication information indicates a first resource allocation table of a plurality of resource allocation tables, and the first resource allocation table corresponds to a first data unit of a plurality of data units;
wherein the transmitter is configured to:
send the indication information in a first timeslot, wherein the first timeslot is earlier than a second timeslot used to send the first data unit; and
consecutively send the plurality of data units, wherein each data unit of the plurality of data units is sent using a respective timeslot of a plurality of consecutive time slots, wherein for each of the plurality of data units a respective resource allocation table of the plurality of resource allocation tables corresponding to the respective data unit of the plurality of data units is selected from the plurality of resource allocation tables in a cyclic manner, and an initial resource allocation table used to send the plurality of data units is the first resource allocation table indicated by the indication information.

7. The device according to claim 6, wherein the program further includes instructions for:
setting the plurality of resource allocation tables, wherein each of the plurality of resource allocation tables indicates a timeslot allocation on a same physical link.

8. The device according to claim 6, wherein for each of the plurality of data units the respective resource allocation table of the plurality of resource allocation tables corresponding to the respective data unit of the plurality of data units being selected from the plurality of resource allocation tables in the cyclic manner comprises:
the first resource allocation table being selected to use in a first plurality of consecutive timeslots, and then a second resource allocation table of the plurality of resource allocation tables being selected to use in a second plurality of consecutive timeslots.

9. The device according to claim 6, wherein the first resource allocation table records a respective service sent in each of a first plurality of timeslots, the first data unit comprises a plurality of data blocks used to carry a first service, and a quantity of timeslots recorded in the first resource allocation table is the same as a quantity of the data blocks comprised in the first data unit.

10. The device according to claim 9, wherein the transmitter is configured to:
for each timeslot occupied by the plurality of data units, determine, based on the respective resource allocation table corresponding to a data unit of the plurality of data units being sent in the respective timeslot, a service sent in the timeslot; and
send, by using the respective timeslot, a data block carrying the service.

11. A non-transitory computer readable storage medium storing instructions, wherein the instructions are executable by one or more processors, and the instructions comprise instructions for:
generating indication information, wherein the indication information indicates a first resource allocation table of a plurality of resource allocation tables, and the first resource allocation table corresponds to a first data unit of a plurality of data units;

sending the indication information in a first timeslot, wherein the first timeslot is earlier than a second timeslot used to send the first data unit; and consecutively sending the plurality of data units, wherein each data unit of the plurality of data units is sent using a respective timeslot of a plurality of consecutive time slots, wherein for each of the plurality of data units a respective resource allocation table of the plurality of resource allocation tables corresponding to the respective data unit of the plurality of data units is selected from the plurality of resource allocation tables in a cyclic manner, and an initial resource allocation table used to send the plurality of data units is the first resource allocation table indicated by the indication information.

12. The non-transitory computer readable storage medium according to claim 11, wherein the instructions further comprise instructions for:

setting the plurality of resource allocation tables, wherein each of the plurality of resource allocation tables indicates a timeslot allocation on a same physical link.

13. The non-transitory computer readable storage medium according to claim 11, wherein for each of the plurality of data units the respective resource allocation table of the plurality of resource allocation tables corresponding to the respective data unit of the plurality of data units being selected from the plurality of resource allocation tables in the cyclic manner comprises:

the first resource allocation table being selected to use in a first plurality of consecutive timeslots, and then a second resource allocation table of the plurality of resource allocation tables being selected to use in a second plurality of consecutive timeslots.

14. The non-transitory computer readable storage medium according to claim 11, wherein the first resource allocation table records a respective service sent in each of a first plurality of timeslots, the first data unit comprises a plurality of data blocks used to carry a first service, and a quantity of timeslots recorded in the first resource allocation table is the same as a quantity of the data blocks comprised in the first data unit.

15. The method according to claim 1, wherein sending the plurality of data units comprises:

for each timeslot occupied by the plurality of data units, determining, based on the respective resource allocation table corresponding to a data unit of the plurality of data units being sent in the respective timeslot, a respective service being sent in the respective timeslot, and sending, using the respective timeslot, a data block carrying the respective service.

* * * * *